United States Patent
Cu-Unjieng et al.

(10) Patent No.: US 10,459,435 B2
(45) Date of Patent: Oct. 29, 2019

(54) TEST MANAGER FOR INDUSTRIAL AUTOMATION CONTROLLERS

(71) Applicant: Yokogawa Electric Corporation, Musashino-shi (JP)

(72) Inventors: Mark Anthony De Castro Cu-Unjieng, Singapore (SG); Chin Wei Chia, Singapore (SG); Jason Allan Lu Ng, Singapore (SG)

(73) Assignee: Yokogawa Electric Corporation, Musashino-shi (JP)

( * ) Notice: Subject to any disclaimer, the term of this patent is extended or adjusted under 35 U.S.C. 154(b) by 88 days.

(21) Appl. No.: 15/295,079

(22) Filed: Oct. 17, 2016

(65) Prior Publication Data
US 2018/0107201 A1 Apr. 19, 2018

(51) Int. Cl.
G05B 23/02 (2006.01)
G06F 11/36 (2006.01)

(52) U.S. Cl.
CPC ...... *G05B 23/0208* (2013.01); *G06F 11/3688* (2013.01); *G05B 23/0256* (2013.01); *G05B 2219/23213* (2013.01); *G05B 2219/50185* (2013.01); *Y02P 90/02* (2015.11)

(58) Field of Classification Search
CPC ...... G05B 23/0208; G05B 2219/23213; G05B 2219/50185
See application file for complete search history.

(56) References Cited

U.S. PATENT DOCUMENTS

| | | | | |
|---|---|---|---|---|
| 5,978,940 A | * | 11/1999 | Newman | H04Q 3/0087 714/712 |
| 6,131,449 A | * | 10/2000 | Modeen | F01D 7/00 73/112.01 |
| 2007/0022324 A1 | * | 1/2007 | Chang | G06F 11/3688 714/38.14 |
| 2008/0319728 A1 | | 12/2008 | Bruski et al. | |
| 2009/0068504 A1 | * | 3/2009 | Andersen | H01M 8/04089 429/429 |
| 2011/0040785 A1 | * | 2/2011 | Steenberg | G05B 23/0235 707/769 |
| 2012/0173931 A1 | * | 7/2012 | Kube | G05B 23/0256 714/37 |

(Continued)

FOREIGN PATENT DOCUMENTS

EP   1 806 636 A1   7/2007

OTHER PUBLICATIONS

Extended European Search Report dated Jul. 24, 2017 in Patent Application No. 17150483.0.

*Primary Examiner* — Yuhui R Pan
(74) *Attorney, Agent, or Firm* — Oblon, McClelland, Maier & Neustadt, L.L.P.

(57) ABSTRACT

An engineering tool for testing a process control system includes one or more test manager instances. Each test manager instance includes circuitry that receives test cases and associated test requests. The circuitry also identifies a target for each test request, translates each test request into instructions to the identified target, checks each test request for validity, initiates execution of each test case, monitors subscribed data generated by the target, computes a difference between the subscribed data at a first point in time and a second point in time, and generates a notification when the computed difference is greater than a predetermined threshold.

16 Claims, 8 Drawing Sheets

(56) References Cited

U.S. PATENT DOCUMENTS

| | | |
|---|---|---|
| 2012/0265490 A1 | 10/2012 | Kube et al. |
| 2014/0181793 A1 | 6/2014 | Kaliappan |
| 2015/0121140 A1* | 4/2015 | Senf .................. G05B 23/0256 |
| | | 714/33 |
| 2016/0188433 A1 | 6/2016 | Kube et al. |

* cited by examiner

TEST MANAGER FOR INDUSTRIAL AUTOMATION CONTROLLERS

TECHNICAL FIELD

This disclosure relates to the field of control systems including industrial or other process control systems. In particular, it relates to the testing of configurations for process controllers and the like.

DESCRIPTION OF THE RELATED ART

Testing the configuration of industrial controllers (also called programmable logic controllers, PLCs, programmable controllers or, simply, controllers) and field devices (sensors and actuators) in a process control system has traditionally been a manual operation. In a typical case, users manually set up test cases and procedures for a process control system and, during testing, manually select appropriate databases, and update values for the test cases to meet the requirements of a given process.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

An engineering tool for testing a process control system includes one or more test manager instances, wherein each test manager instance includes circuitry configured to receive at least one test case and associated test request from a source of test cases, identify a target for each test request, translate each test request into instructions to the identified target, check each test request for validity, initiate execution of each test case, monitor subscribed data generated by the target for each test case, compute a difference between the subscribed data at a first point in time and a second point in time, and generate a notification when the computed difference is greater than a first predetermined threshold.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
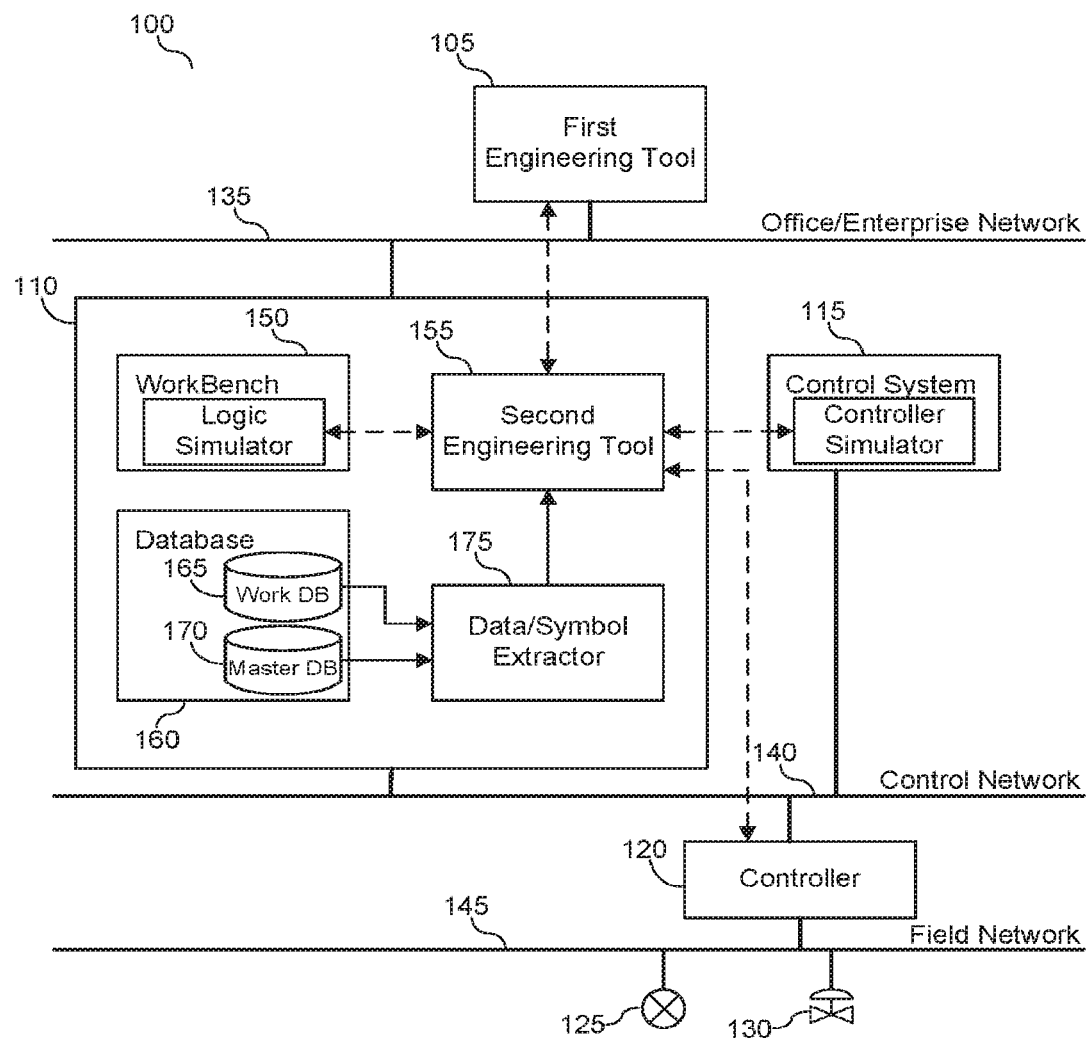
FIG. 1 illustrates a process control system environment that includes a process control system and development and testing facilities.

When an industrial process is being developed or modified, one or more controllers must be programmed to monitor and control the various steps of the process.

A controller may have an associated logic simulator, controller simulator and physical controller, all of which are required to be tested with a new controller program (process control program). The logic simulator is a software program that simulates the behavior of the controller program on a workstation (computer). The purpose of the logic simulator is to test that the controller program has been defined correctly and confirm that the controller program enables the controllers and field devices to function according to a design specification. The controller simulator is a program to simulate controller actions on a workstation. The purpose of the controller simulator is to test the controller program by checking if the controller functions according to a design specification in a simulated environment. Finally, the actual (physical) controller may be tested with the controller program to ensure that the controller functions according to the design specification in an actual environment, but with the controller off-line (not controlling a manufacturing process). The controller may be programmed using programming languages specified in the standard IEC 61131-3 for programmable logic controllers (PLC) or distributed control systems (DCS). The controller may be part of a DCS or a safety instrumented system (SIS).

Referring now to the drawings, wherein like reference numerals designate identical or corresponding parts throughout the several views.

FIG. 1 illustrates a first process control system environment 100 that includes a process control system and development and testing facilities. Process control system environment 100 includes a first engineering tool 105 (which may be implemented on a PC or other computer), a workstation 110, a control system 115 (controller simulator), one or more controllers 120, and field devices, including sensors 125 and actuators 130. Controller 120 controls processes through field devices within the process control system. By way of example, sensors 125 may communicate feedback to controller 120 regarding the state of one or more processes. Based on received feedback, controller 120 may generate control signals and communicate them to actuators 130 to control processes under execution. In addition, controller 120 may provide feedback (current system state, historical data, trends, etc.), and alerts (system operating outside of specified limits, failed field device or other component, etc.) to one or more operators of process control system environment 100. Office/Enterprise network 135 may be used to interconnect various components of process control system environment 100, including first engineering tool 105 and workstation 110. Control network 140 may be used to interconnect controller 120 to workstation 110 and control system 115. Field network 145 may be used to interconnect one or more controllers 120, and field devices, including sensors 125 and actuators 130.

First engineering tool 105 may be employed to define, test and document the controller program for controller 120. When used to create test cases for testing the accuracy of the controller logic, first engineering tool 105 may be used to initiate communication with workstation 110 for the purpose of running the test cases on a logic simulator, a controller simulator, or the actual (physical) controller 120.

Workstation 110 may include hardware and/or software that provides functionality for workbench 150 (logic simulator), second engineering tool 155, database 160 (including work database 165 and master database 170), and data/symbol extractor 175.

Process control system environment 100 provides three different but related testing environments, logic simulator (using workbench 150), controller simulator (using control system 115), and the actual (physical) controller 120. While being tested, controller 120 must be in an off-line state (not running in an active manufacturing process).

The logic simulator (workbench 150) shown in FIG. 1 is a software component that emulates the behavior of POUs (Program Organization Units) on workstation 110. Program Organization Units are functions, function blocks and programs that may be combined to form the controller programs. The POUs are reusable within a program and may be stored in user-declared libraries for import into other controller programs. The purpose of the logic simulator (workbench 150) is to confirm that the logic of the controller program has been defined correctly and check that the controller program enables the controllers and field devices to function according to a design specification. The logic simulator (workbench 150) may read variables and other data, as needed, from work database 165 during execution of test cases. Variables are values and parameters accessed by the POUs during execution of the controller programs. Default values for variables may be extracted from one of the databases and applied during testing of the controller programs. Additional values for variables may be injected during execution of test cases.

Work database 165 is a working database which has not been compiled. Work database 165 is used by the logic simulator. Work database 165 is not downloaded to the logic simulator before use/execution of test cases. The logic simulator (in workbench 150) only reads from work database 165. Master database 170 is a database which has been compiled and ready to be deployed for use by the controller simulator (using control system 115) and physical controller 120. Master database 170 must be downloaded to the controller simulator (using control system 115) or the physical controller 120 before execution of test cases. More importantly, master database 170 has more data associated with the controller, such as network address, controller type, and communication protocols.

The controller simulator (control system 115) is a software component that simulates the actual controller actions on a computer. The purpose of the controller simulator is to test the logic of the controller program by checking if the controller functions according to design specifications in a simulated production environment. The controller simulator (control system 115) may read variables and other data, as needed, from master database 170 during execution of test cases.

Controller 120 allows testing of the controller program by checking that the controller functions according to design specifications in an actual production environment. Controller 120 may read variables and other data, as needed, from master database 170 during execution of test cases.

During actual production process control, the controller functions based on predefined control actions as well as trigger events (such as abnormal values of variables, disturbances, etc.). The test procedures, using defined test cases, may inject various scenarios and test how the controller program behaves and what output is generated by the controller program to send commands to the controller and field devices.

Figure 2:
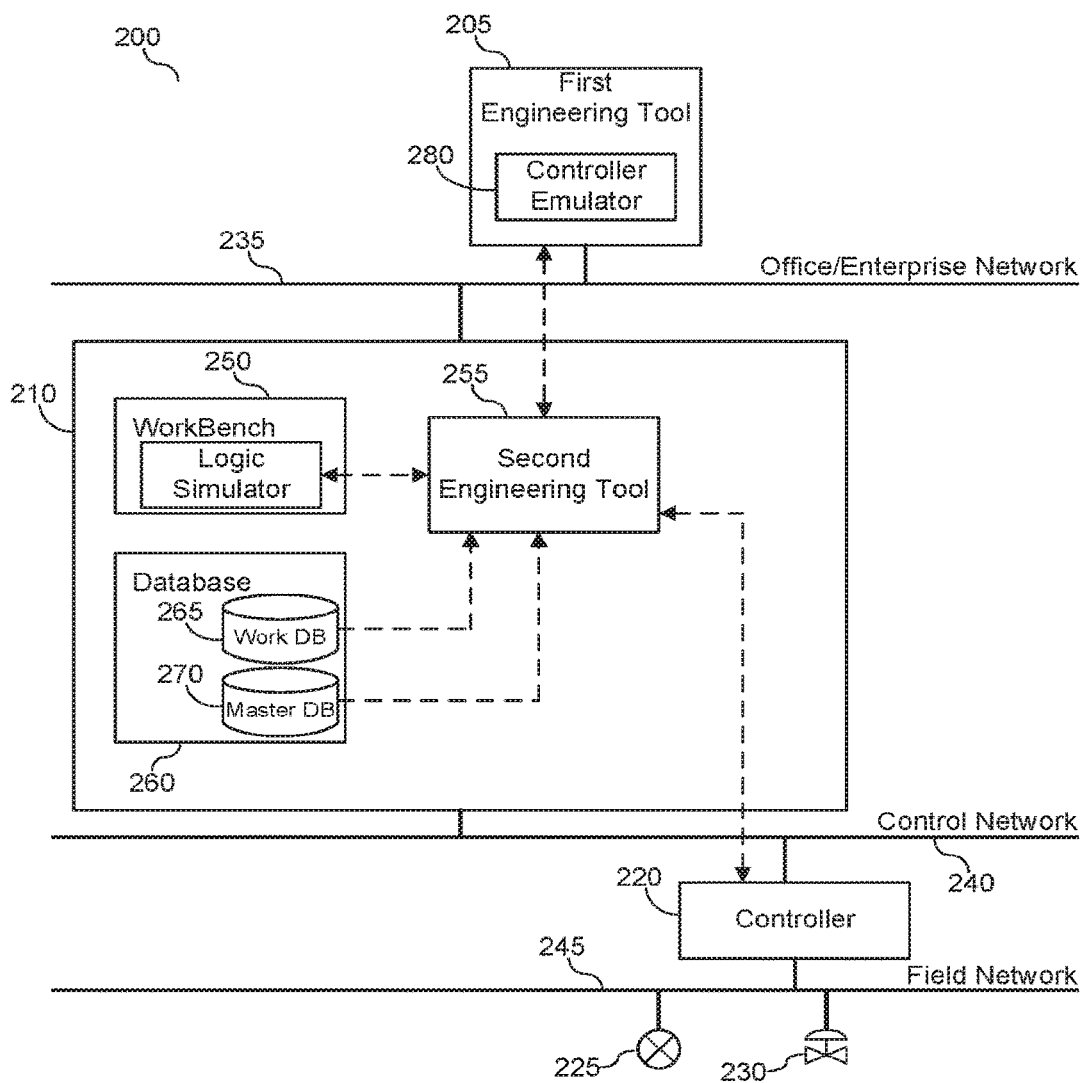
FIG. 2 illustrates another process control system environment that includes a process control system and development and testing facilities.

An alternative scenario is illustrated in FIG. 2. In FIG. 2, a process control system environment 200 includes a process control system and development and testing facilities. Process control system environment 200 includes a first engineering tool 205, a workstation 210, one or more controllers 220, and field devices, including sensors 225 and actuators 230. Office/Enterprise network 235 may be used to interconnect various components of the process control system environment 200, including first engineering tool 205 and workstation 210. Control network 240 may be used to interconnect controller 220 to workstation 210. Field network 245 may be used to interconnect one or more controllers 220, and field devices, including sensors 225 and actuators 230. First engineering tool 205, in process control system environment 200, includes controller emulator 280, which may function similar to the controller simulator (control system 115) in FIG. 1. Controller emulator 280 is a software component that emulates the actual controller actions on first engineering tool 205. The purpose of the controller emulator is to test the logic by checking if the controller functions according to design specifications in a simulated production environment.

First engineering tool 205 may be employed to define, test and document the controller program for controller 220. When used to create test cases for testing the accuracy of the controller logic, first engineering tool 205 may be used to initiate communication with workstation 210 for the purpose of running the test cases on a logic simulator, a controller emulator, or the actual (physical) controller 220.

Workstation 210 may include hardware and/or software that provide functionality for workbench 250 (logic simulator), second engineering tool 255, and database 260 (including work database 265 and master database 270).

Process control system environment 200 provides three different but related testing environments, logic simulator (using workbench 250), controller emulator (in first engineering tool 205), and the actual (physical) controller 220. While being tested, controller 220 must be in an off-line state (not running in an active manufacturing process).

As with the system illustrated in FIG. 1, the logic simulator (workbench 250) shown in FIG. 2 is a software component that emulates the behavior of POUs on workstation 210. The purpose of the logic simulator (workbench 250) is to confirm that the logic of the controller program has been defined correctly and check that the controller program enables the controllers and field devices to function according to a design specification. The logic simulator (workbench 250) may read variables and other data, as needed, from work database 265 during execution of test cases.

The controller emulator (in first engineering tool 205) is a software component that emulates the actual controller actions on first engineering tool 205. The purpose of the controller emulator is to test the logic of the controller program by checking if the controller functions according to design specifications in a simulated production environment. The controller emulator may read variables and other data, as needed, from master database 270 during execution of test cases.

Controller 220 allows testing of the controller program by checking that the controller functions according to design specifications in an actual production environment. Controller 220 may read variables and other data, as needed, from master database 270 during execution of test cases.

During actual production process control, the controller functions based on predefined control actions as well as trigger events (such as abnormal values of variables, disturbances, etc.). The test procedures, using defined test cases, may inject various scenarios and test how the controller program behaves and what output is generated by the controller program to send commands to the controller and field devices.

In the embodiments illustrated in FIGS. 1 and 2, the logic simulator, controller simulator/emulator and physical controller are typically set up manually for testing and the testing itself is performed as a manual operation. Each of the tests is performed separately for each controller and for each of the testing targets (the logic simulator, controller simulator/emulator and physical controller). For example, as part of a specific test setup, a user may manually setup a specific simulator, choose a database (work database or master database) which is to be in communication with the testing target (possibly through a data extractor), and then manually execute the test cases for the selected simulator.

Figure 5:
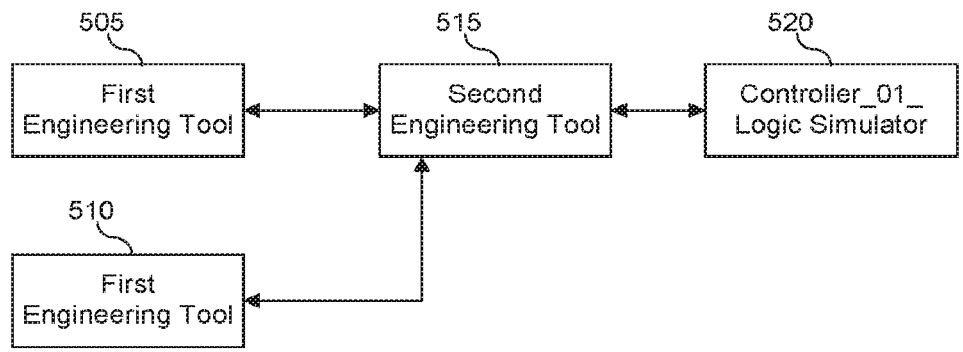
FIG. 5 illustrates a communication/command flow for testing of a logic simulator in a manual mode.

FIG. 5 illustrates a communication/command flow for testing of a logic simulator in a manual mode. A user of first engineering tool 505 creates test cases and communicates, through second engineering tool 515, with controller_01_logic simulator 520. As part of the testing process, the user interacts with controller_01_logic simulator 520, through second engineering tool 515, to modify values in test cases using first engineering tool 510.

Figure 6:
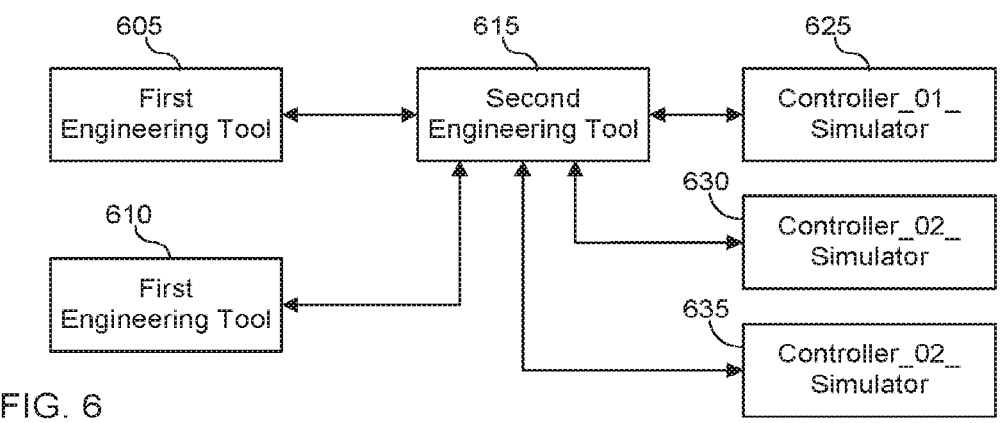
FIG. 6 illustrates a communication/command flow for testing of controller simulators in a manual mode.

FIG. 6 illustrates a communication/command flow for testing of controller simulators in a manual mode. Again, a user of first engineering tool 605 creates test cases and communicates, through second engineering tool 615, with controller_01_simulator 625, controller_02_simulator 630, and controller_03_simulator 635. As part of the testing process, the user interacts with the controller simulators, through second engineering tool 615, to modify values in test cases using first engineering tool 610.

Figure 7:
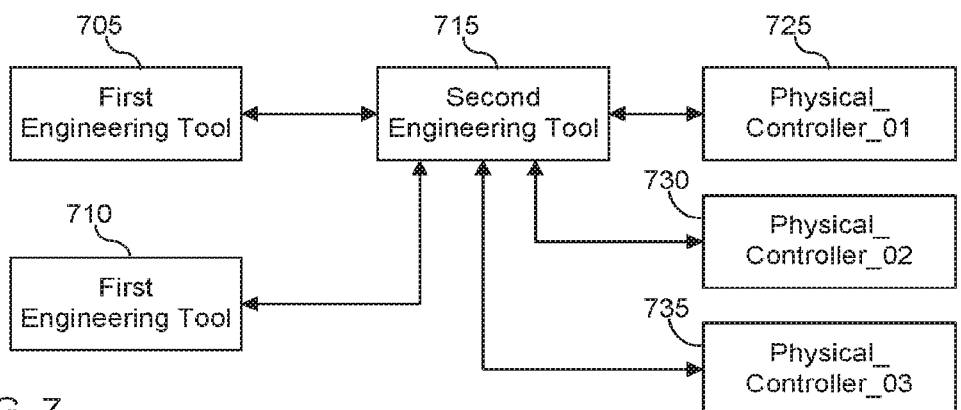
FIG. 7 illustrates a communication/command flow for testing of physical controllers in a manual mode.

FIG. 7 illustrates a communication/command flow for testing of physical controllers in a manual mode. Once again, a user of first engineering tool 705 creates test cases and communicates, through second engineering tool 715, with physical_controller_01 725, physical_controller_02 730, and physical_controller_03 735. As part of the testing process, the user interacts with the physical controllers, through second engineering tool 715, to modify values in test cases using first engineering tool 710.

In addition, in the embodiments illustrated in FIGS. 1 and 2, when the engineering tools communicate with multiple controllers, the data that is read from the controllers for monitoring the test procedure may not be displayed accurately. This diminishes the ability for users to adjust test variables for successive test cases. This reduces the efficiency and reliability of testing.

Finally, since the communication protocols for communicating with a simulator/emulator may be different from that for a physical controller, testing of a simulator/emulator and a physical controller may only be performed separately due to the different communication protocols.

In some setups, first engineering tool 205 includes controller emulator 280 as in FIG. 2. Controller emulator 280 may be tested instead of controller simulator 115 as in FIG. 1. This may be more convenient for testing since there is no need to set up an additional communication to the controller simulator 115, which has a different communication protocol from the physical controller. However, it is well known to a person skilled in the art that testing an emulator is less efficient.

Figure 9:
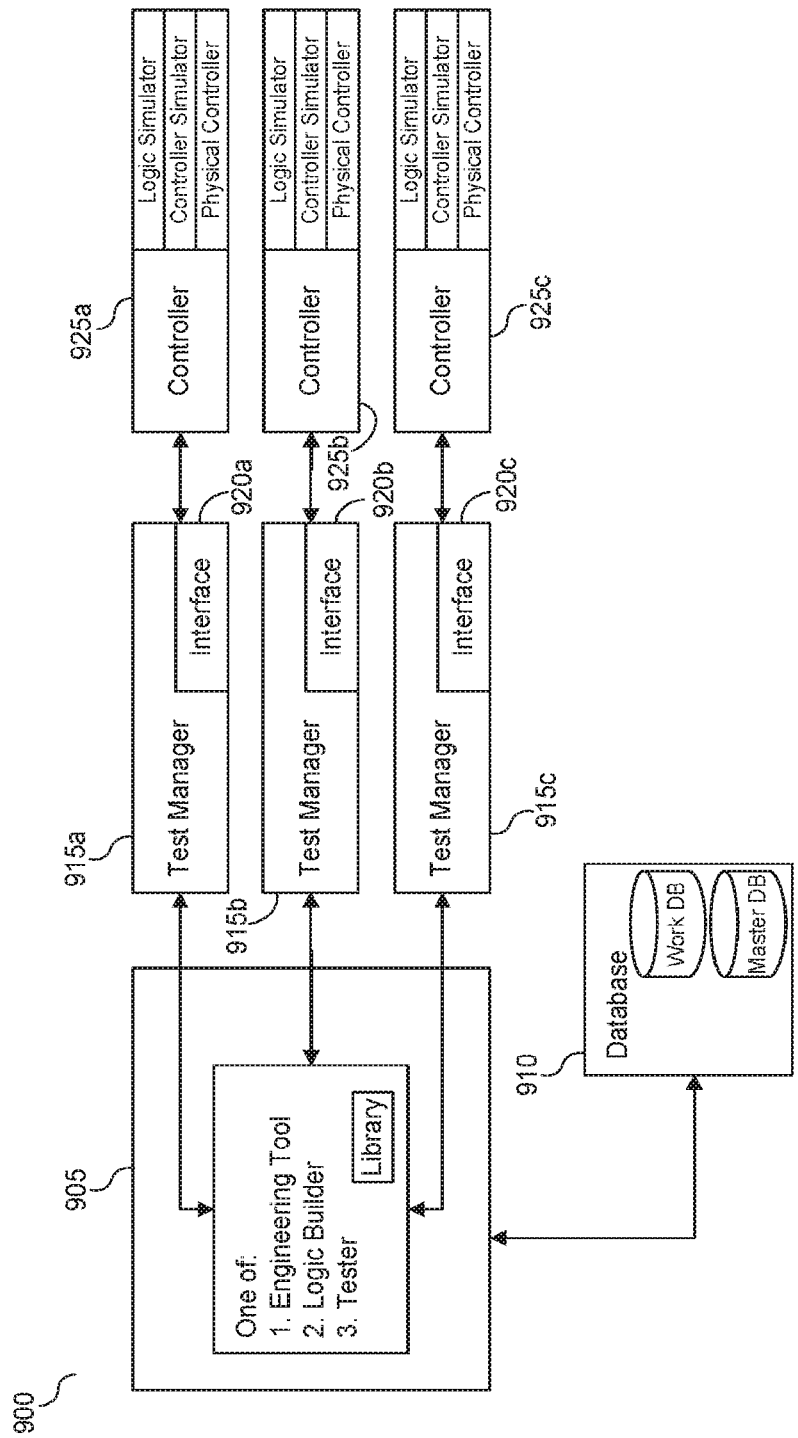
FIG. 9 illustrates a communication/command flow for an improved testing scenario.

FIG. 9 illustrates a communication/command flow for an improved testing scenario 900. In improved testing scenario 900, a source of test cases 905 (which may be an engineering tool, a logic builder, or a tester) may communicate with database 910 and with individual test manager instances 915a, 915b, and 915c. The function of the engineering tool may be to configure, setup, and enable input-output data to be written to, and read from, a controller. The function of the logic builder is to create POUs for the controller. The function of the tester is to validate/test controllers. Each test manager instance 915a, 915b, and 915c includes an interface 920a, 920b, and 920c for communication with a controller 925a, 925b, and 925c (where each controller may have an affiliated logic simulator, a controller simulator, as well as a physical controller).

Figure 3:
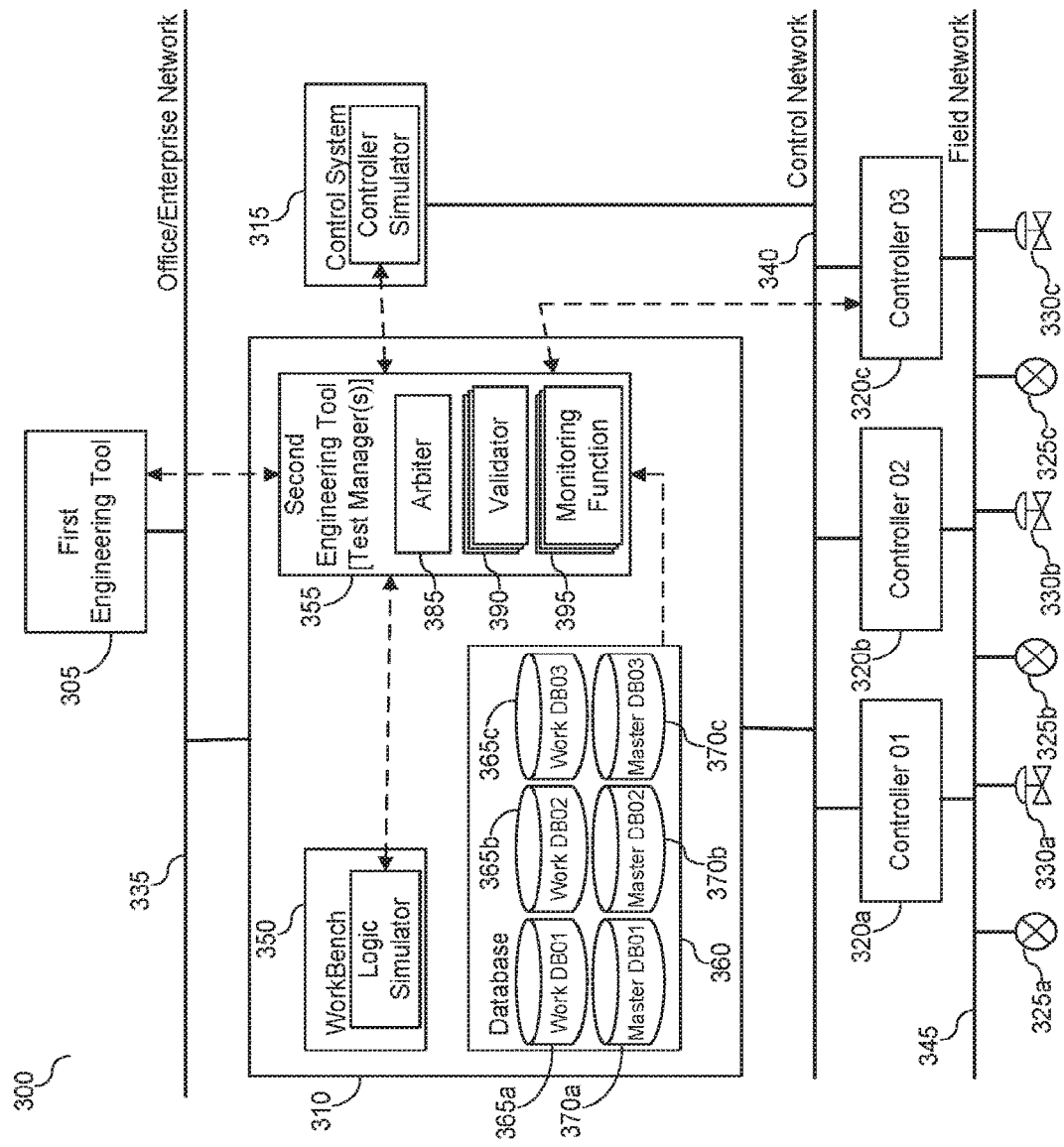
FIG. 3 illustrates yet another process control system environment that includes a process control system and development and testing facilities.

Yet another scenario is illustrated in FIG. 3. In FIG. 3, process control system environment 300 includes a first engineering tool 305, a workstation 310, a control system 315 (controller simulator), a plurality of controllers 320a, 320b, and 320c, and a plurality of field devices, including sensors 325a, 325b, and 325c and actuators 330a, 330b, and 330c. Controllers 320a, 320b, and 320c control processes through the field devices within process control system environment 300. Office/Enterprise network 335 may be used to interconnect various components of process control system environment 300, including first engineering tool 305 and workstation 310. Control network 340 may be used to interconnect controllers 320a, 320b, and 320c to workstation 310 and control system 315. Field network 345 may be used to interconnect one or more controllers 320a, 320b, and 320c, and field devices, including sensors 325a, 325b, and 325c and actuators 330a, 330b, and 330c.

Workstation 310 may include hardware circuitry and/or software that provide functionality for workbench 350 (logic simulator), second engineering tool 355, and database 360 (including work databases 365a, 365b, and 365c and master databases 370a, 370b, and 370c). Workstation 310 may also include a non-transitory computer-readable medium storing computer-readable instructions, which may be executed by workstation 310 to implement the features discussed herein.

Process control system environment 300, illustrated in FIG. 3, also includes a test manager that may include one or more test manager instances as part of second engineering tool 355. The use of multiple test manager instances may improve and streamline the validation and testing process for controllers 320a, 320b, and 320c. For example, each test manager instance in second engineering tool 355 may include a communication structure for data communication between the source of test cases in first engineering tool 305 and controllers 320a, 320b, and 320c to improve testing reliability and efficiency. The communication structure in each test manager instance may translate testing requests from first engineering tool 305 into appropriate instructions to initiate a test case in the designated testing target. Additionally, each test manager instance in second engineering tool 355 may include the capability to identify and use individual instances of work databases 365a, 365b, and 365c and master databases 370a, 370b, and 370c, where each database instance may be associated with a particular controller. This may improve the efficiency of extracting variables and other data for performing tests. Furthermore, each test manager instance in second engineering tool 355 may enable the testing in an offline mode.

Each test manager instance in second engineering tool 355 may include validator 390, which may be used to check testing requests from first engineering tool 305 for the validity of the target device (if the target is a controller, the controller must be in an offline state to be valid) and checks the data to be written to, and read from, the target.

Each test manager instance in second engineering tool 355 may also include monitoring function 395, which may be used to continuously read subscribed data (data generated by the testing target during execution of the test cases). Monitoring function 395 may also compute a difference between the subscribed data at a first point in time and the subscribed data at a second point in time ($N_t$ vs. $N_{t-1}$), and generate a notification if there is a difference. For example, if the data value of a variable N at time t is identical to the data value of N at time t−1 ($N_t=N_{t-1}$), then no notification is generated, but if the data value of a variable N at time t is not identical to the data value of N at time t−1 ($N_t \neq N_{t-1}$), then a notification is generated. In some embodiments, a notification may only be generated if the difference is greater than a predetermined threshold. In other embodiments, a notification may only be generated if a difference is greater than a predetermined threshold on more than a predetermined number of consecutive data values. In other embodiments, an alert may be generated when there is any difference between the data value at time t and t−1 ($N_t \neq N_{t-1}$).

In some embodiments, monitoring function 395 and validator 390, may be implemented in separate processors or processor elements (cores) to enable concurrent, parallel operation in each test manager instance. This provides an important improvement over the embodiments illustrated in FIGS. 1 and 2 because a user may need to view the data which is read from the target controller during execution of test cases in real time. The concurrent operation of monitoring function 395 and validator 390 is for the same controller, as each test manager instance can only communicate with one controller at a time.

Second engineering tool 355 may also include arbiter 385, which may be used when multiple test manager instances and multiple controllers are connected for testing. Arbiter 385 may manage a queueing priority that, in some embodiments, may allow one testing target to complete a test case before starting a test case on the next target. This may improve the reliability and efficiency of testing multiple controllers.

In some embodiments of second engineering tool 355 each test manager instance may be implemented as a separate processor or processor element, each having a dedicated communication link with one of the controllers 320a, 320b, and 320c. In such embodiments, each of controllers 320a, 320b, and 320c has an associated logic simulator, controller simulator and physical controller, all of which are tested in a predefined sequence.

In some embodiments, each test manager instance in second engineering tool 355 receives requests based on test cases from a source (such as first engineering tool 305). A test manager instance in second engineering tool 355 may receive test requests in the form of test commands. Configuration files may be used with the test manager to identify the information regarding the test target. The information may include target type (logic simulator, controller simulator, and physical controller), address of the target, and connection properties (communication protocol) for the target.

Figure 8:
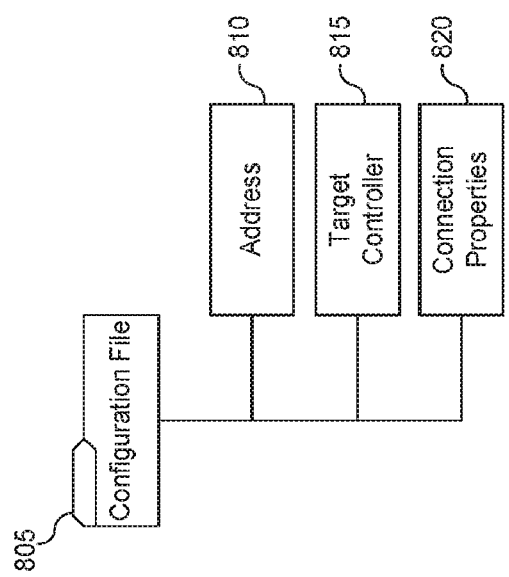
FIG. 8 illustrates a simplified structure of one possible configuration file.

FIG. 8 illustrates a simplified structure of one possible configuration file. Configuration file 805 includes address 810 of the target, target controller type 815, and connection properties 820 (communication protocol) for the target.

Figure 4:
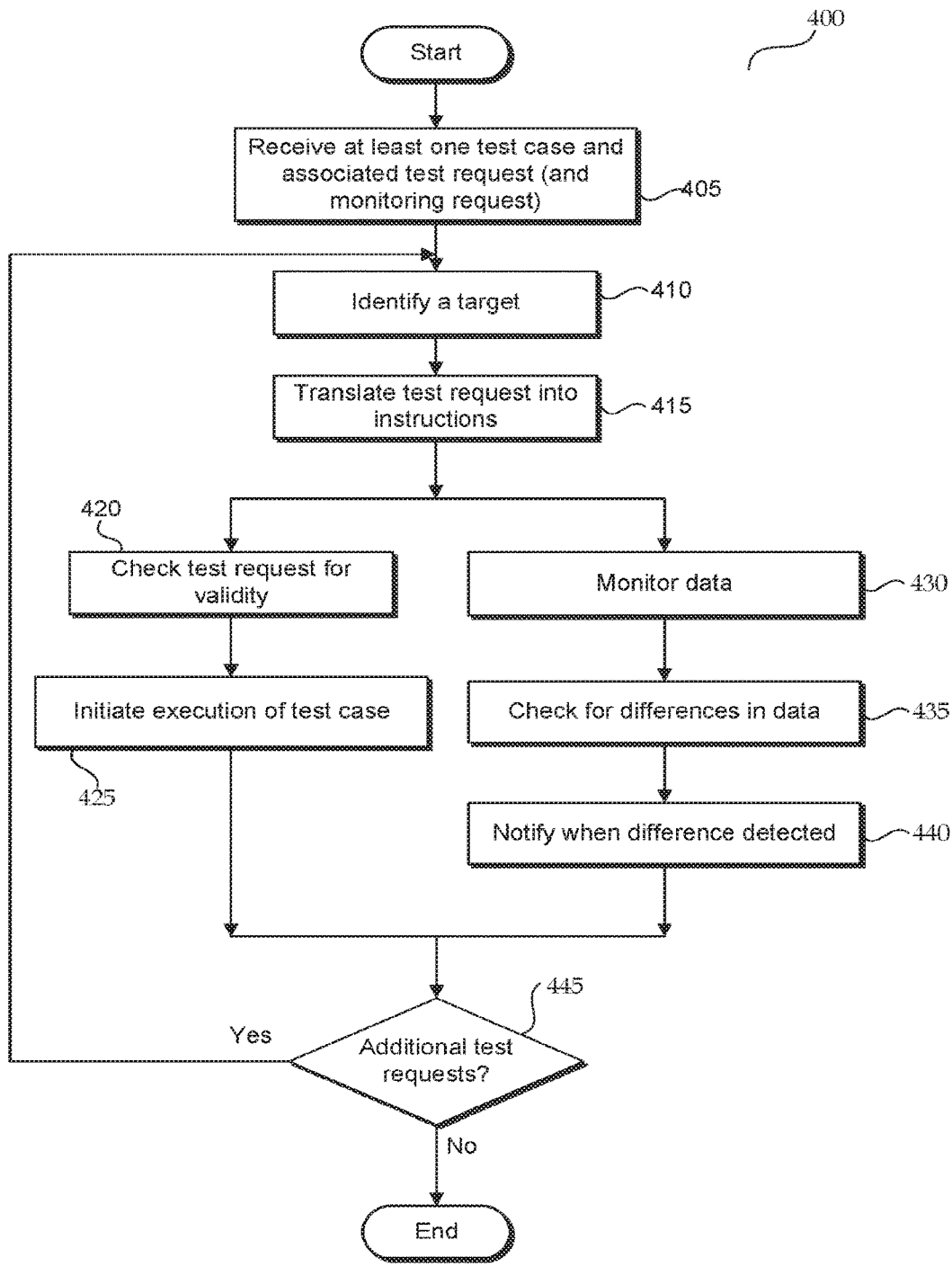
FIG. 4 illustrates a flow diagram for the testing of a process control system.

FIG. 4 illustrates a flow diagram for a testing method 400 of a process control system. The testing flow begins at step 405 wherein at least one test case and associated test request and, optionally, a monitoring request is received to test (and monitor) one or more controllers and affiliated logic simulators and controller simulators. Typically, at least one test case would be defined for each controller in a process control system (including the logic simulator, controller simulator, and physical controller). The logic simulator, controller simulator, and physical controller would be setup to be tested in a predefined sequence.

In step 410 of testing method 400, a target is identified for a test request. In some embodiments, the test manager uses a configuration file to identify information about the test target. The information may include: target type, address of the target, and connection properties (communication protocol, for example). The identified test target may determine which test manager will process the test request.

In step 415 of testing method 400, a test request is translated into a series of instructions to be sent to the appropriate target.

If only a test request is received (no monitoring request), only the validator in a test manager instance would continue from this point to check validity of the test request. If both a test request and a monitoring request are received, both validation and monitoring are performed concurrently since, as noted above, they may be implemented on one or more processors or processor elements (cores).

In step 420 of testing method 400, a validator in a test manager instance checks that a test request is valid. A test request is valid if the specified target is valid, that is, when the target is present in the control network or field network. If the target is a physical controller, the target is valid only if the controller is in an offline state (not actively controlling a process). If the target is not valid, the request is not performed and a message may be generated to a user interface.

In step 425 of testing method 400, a test manager instance initiates execution of the test case in the target controller or the affiliated logic simulator or controller simulator.

Concurrently, in step 430 of testing method 400, a test manager instance monitors subscribed data produced by the target while executing the test case when a monitoring request is received together with a test request.

In step 435 of testing method 400, a test manager instance checks differences in the data from a first point in time to a second point in time ($N_t$ vs. $N_{t-1}$), as described in detail above.

In step 440 of testing method 400, a test manager instance generates a notification if there is a difference in the monitored data ($N_t \neq N_{t-1}$).

When a test case is complete, in step 445 of testing method 400, the method determines if additional test requests are pending. If additional test requests are pending, then the flow returns to step 410 to begin processing the next test request.

It should be noted that it may be perfectly acceptable for the execution of a test case to continue when step 445 is reached. In this case, the monitoring function of steps 430, 435, and 440 may continue while the next test request is being handled. As noted above, monitoring function 395 and validator 390, may be implemented in separate processors or processor elements (cores) to enable concurrent, parallel operation in each test manager instance.

The monitoring function of steps 430, 435, and 440 may be implemented on a different processor or processor element from the validation in step 420. This may allow parallel execution of the test cases and an asynchronous reading of the data produced by the test cases. This may enable a user to view the data which is read from the target during execution of test cases in real time.

Also, as noted above, each test manager instance may identify a specific database instance associated with a particular controller. This may improve the efficiency of extracting variables for performing tests by switching between different database instances. In some embodiments, the multiple instances of databases are stored within the test manager instance to further improve accessibility.

Figure 10:
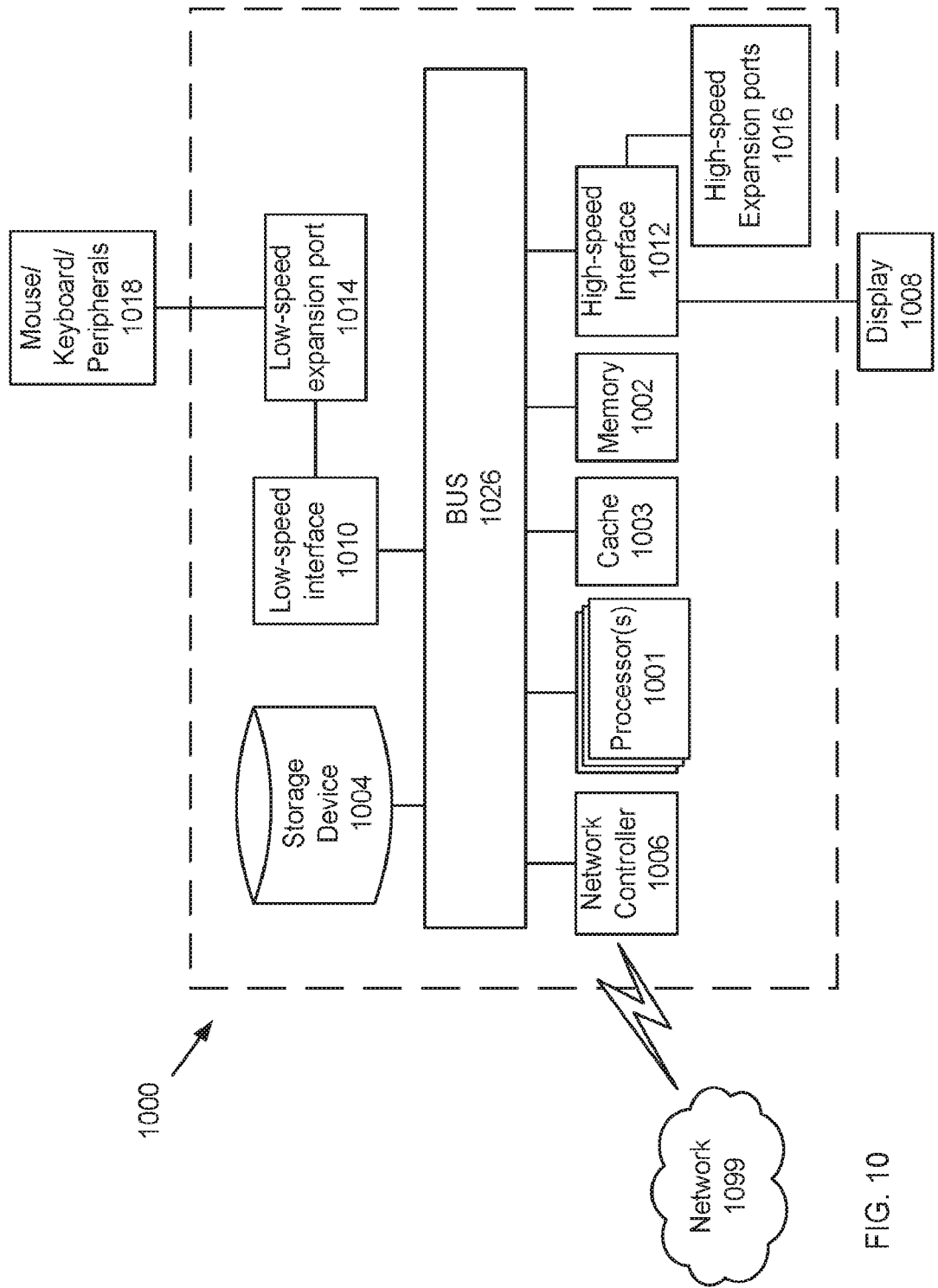
FIG. 10 is a functional block diagram of an exemplary computing device.

FIG. 10 is a functional block diagram of an exemplary computing device 1000, such as first engineering tool 305, workstation 310 and second engineering tool 355, all of which can be used to implement the techniques described herein. Computing device 1000 is intended to represent various forms of digital hardware, such as laptops, desktops, workstations, personal digital assistants, servers, blade servers, mainframes, and other appropriate computers. The components shown here, their circuitry, connections and relationships, and their functions are meant to be examples only and are not meant to be limiting.

Computing device 1000 includes one or more processors 1000 (where each processor may include one or more processor circuits, elements or cores), memory 1002, cache 1003, a storage device 1004, a high-speed interface 1012 connecting to multiple high-speed expansion ports 1016, and a low-speed interface 1010 connecting to a low-speed expansion port 1014. Each of the processors 1001, memory 1002, cache 1003, storage device 1004, high-speed interface 1012, high-speed expansion ports 1016, and low-speed interface 1010 are interconnected using various busses, such as communication bus 1026, and may be mounted on a common motherboard or in other manners as appropriate.

Processors 1001 can process instructions for execution within computing device 1000, including instructions stored in memory 1002 or on storage device 1004 to display graphical information for a GUI on an external input/output device, such as display 1008 coupled to high-speed interface 1012. In other implementations, multiple buses may be used, as appropriate, along with multiple memories and types of memory. Also, multiple computing devices may be connected, with each device providing portions of the necessary operations (e.g., as a server bank, a group of blade servers, or a multi-processor system).

Memory 1002 stores information within computing device 1000. In some implementations, memory 1002 is a volatile memory unit or units. In some implementations, memory 1002 is a non-volatile memory unit or units. Memory 1002 can also be another form of computer-readable medium, such as a magnetic or optical disk.

Cache 1003 is used by processors 1001 to reduce the average time or energy to access data from memory 1002. Cache 1003 is generally smaller and faster than memory 1002. Cache 1003 stores copies of data from frequently used locations in memory 1002. Cache 1003 can be an independent cache and can include an instruction cache and a data cache. The data cache can be organized as a hierarchy of multiple cache levels. When processors 1001 need to read from or write to a location in memory 1002, it first checks whether a copy of the data is in cache 1003. If so, processors 1001 read from or write to cache 1003, which is much faster than reading from or writing to memory 1002.

Storage device 1004 is capable of providing mass storage for computing device 1000. In some implementations, storage device 1004 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processors 1001), perform one or more methods, such as those described above. The instructions can also be stored by one or more storage devices, such as computer- or machine-readable media (for example, memory 1002, storage device 1004, or memory on processors 1001).

High-speed interface 1012 manages bandwidth-intensive operations for computing device 1000, while low-speed interface 1010 manages lower bandwidth-intensive operations. Such allocation of functions is an example only. In some implementations, high-speed interface 1012 is coupled to display 1008 (e.g., through a graphics processor or accelerator), and to high-speed expansion ports 1016, which may accept various expansion cards. In an implementation, low-speed interface 1010 is coupled to low-speed expansion port 1014. Low-speed expansion port 1014, which can include various communication ports (e.g., USB, Bluetooth, Ethernet, wireless Ethernet) can be coupled to one or more input/output devices 1018, such as a keyboard, a pointing device, a scanner, or a networking device such as a switch or router, e.g., through a network adapter.

Computing device 1000 also includes a network controller 1006 for interfacing with a network 1099. As can be appreciated, network 1099 can be a public network, such as the Internet, or a private network such as an LAN or WAN network, or any combination thereof and can also include PSTN or ISDN sub-networks. Network 1099 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Although the computing device of FIG. 10 is described as having a storage medium device 1004, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having display device 1008 (e.g., a CRT (cathode ray tube) or LCD (liquid crystal display) monitor) for displaying information to a user and a keyboard and a pointing device 1018 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The invention claimed is:

1. An engineering tool for testing a process control system, the engineering tool comprising:
   one or more test manager instances, wherein each test manager instance includes first circuitry configured to:
   receive at least one test case and associated test request from a source of test cases;
   identify, from a plurality of targets, a target for each test request, wherein the plurality of targets include a physical controller, a logic simulator, and a controller simulator;
   translate each test request into a series of instructions for the identified target;
   check each test request for validity of the identified target before its associated test case is executed;
   identify one or more database instances for use with each test case including identifying a work database that has not been compiled for use when the logic simulator is the identified target and identifying a master database that has been compiled for use when at least one of the physical controller and the controller simulator is the identified target;
   read variables for each test case from the one or more database instances after its associated test request is checked for validity;
   check validity of data to be written to the identified target for each test case;
   initiate execution of each test case;
   check validity of data read from the identified target for each test case;
   monitor subscribed data generated by the identified target for each test case;
   compute a difference between the subscribed data at a first point in time and the subscribed data at a second point in time; and
   generate a notification when the computed difference is greater than a first predetermined threshold.

2. The engineering tool of claim 1, further comprising:
   an arbiter in communication with each of the one or more test manager instances, wherein the arbiter includes second circuitry configured to manage a queueing priority for initiating execution of each test case.

3. The engineering tool of claim 1, wherein the first circuitry for each of the one or more test manager instances is a separate processor.

4. The engineering tool of claim 1, wherein the first circuitry to check validity of the data and the first circuitry to monitor data generated by each test case in each of the one or more test manager instances are implemented concurrently in separate processors.

5. The engineering tool of claim 1, wherein, when the identified target is the physical controller, the check for validity of the identified target includes checking that the physical controller is in an offline state.

6. The engineering tool of claim 1, wherein a configuration file is used to identify the identified target.

7. The engineering tool of claim 1, wherein the first circuitry is further configured to generate the notification when the computed difference is greater than a second predetermined threshold on more than a predetermined number of consecutive data values.

8. A method of testing a process control system, the method comprising:
   receiving at least one test case and associated test request from a source of test cases;
   identifying, from a plurality of targets, a target for each test request, wherein the plurality of targets include a physical controller, a logic simulator and a controller simulator;
   translating each test request into a series of instructions for the identified target;
   checking each test request for validity of the identified target before its associated test case is executed;
   identifying one or more database instances for use with each test case including identifying a work database that has not been compiled for use when the logic simulator is the identified target and identifying a master database that has been compiled for use when at least one of the physical controller and the controller simulator is the identified target;

reading variables for each test case from the one or more database instances after its associated test request is checked for validity;

checking validity of data to be written to the identified target for each test case;

initiating execution of each test case;

checking validity of data read from the identified target for each test case;

monitoring, using circuitry, subscribed data generated by the identified target for each test case; and computing, using the circuitry, a difference between the subscribed data at a first point in time and the subscribed data at a second point in time; and generating a notification when the difference is greater than a predetermined threshold.

9. The method of claim 8, further comprising arbitrating among the at least one test case and associated test request based on a queueing priority.

10. The method of claim 9, wherein the arbitrating confirms that a first test case is completed on the identified target before starting another test case on the identified target.

11. The method of claim 8, wherein, when the identified target is the physical controller, the check for validity of the identified target includes checking that the physical controller is in an offline state.

12. A non-transitory computer-readable medium storing computer-readable instructions thereon which when executed by a computer cause the computer to perform a method comprising:

receiving at least one test case and associated test request from a source of test cases;

identifying, from a plurality of targets, a target for each test request, wherein the plurality of targets include a physical controller, a logic simulator and a controller simulator;

translating each test request into a series of instructions the identified target;

checking each test request for validity of the identified target before its associated test case is executed;

identifying one or more database instances for use with each test case including identifying a work database that has not been compiled for use when the logic simulator is the identified target and identifying a master database that has been compiled for use when at least one of the physical controller and the controller simulator is the identified target;

reading variables for each test case from the one or more database instances after its associated test request is checked for validity;

checking validity of data to be written to the identified target for each test case;

initiating execution of each test case;

checking validity of data read from the identified target for each test case;

monitoring subscribed data generated by the identified target for each test case; and computing a difference between the subscribed data at a first point in time and the subscribed data at a second point in time; and generating a notification when the difference is greater than a predetermined threshold.

13. The non-transitory computer-readable medium according to claim 12, wherein the method further comprises arbitrating among the at least one test case and associated test request based on a queueing priority.

14. The non-transitory computer-readable medium according to claim 13, wherein the arbitrating confirms that a first test case is completed on the identified target before starting another test case on the identified target.

15. The non-transitory computer-readable medium according to claim 12, wherein, when the identified target is the physical controller, the check for validity of the identified target includes checking that the physical controller is in an offline state.

16. The non-transitory computer-readable medium according to claim 12, wherein the method further comprises generating the notification when the computed difference is greater than a second predetermined threshold on more than a predetermined number of consecutive data values.

* * * * *